United States Patent [19]

Bates et al.

[11] Patent Number: 5,236,743
[45] Date of Patent: Aug. 17, 1993

[54] METHOD FOR CONTINUOUSLY COATING FIBERS

[75] Inventors: Philip J. Bates; Jean-Michel Charrier, both of Montreal, Canada

[73] Assignee: Vetrotex Saint Gobain, Chambery, France

[21] Appl. No.: 852,282

[22] Filed: Mar. 16, 1992

Related U.S. Application Data

[62] Division of Ser. No. 582,293, Sep. 13, 1990, Pat. No. 5,133,282.

[30] Foreign Application Priority Data

Sep. 14, 1989 [FR] France .................................. 89 12064

[51] Int. Cl.⁵ ........................... B05D 3/00; B05D 1/18
[52] U.S. Cl. ................................. 427/398.1; 118/420;
118/423; 118/DIG. 19; 118/DIG. 20; 156/441;
156/494; 427/434.6
[58] Field of Search ............... 118/420, 423, DIG. 19,
118/DIG. 20; 19/65 T; 156/441, 494;
427/434.6, 398.1

[56] References Cited

U.S. PATENT DOCUMENTS

| | | | |
|---|---|---|---|
| 3,874,030 | 4/1975 | Knight | 19/65 T |
| 3,875,900 | 4/1975 | Warner et al. | 118/423 |
| 3,893,412 | 7/1975 | Louch et al. | 118/420 |
| 4,325,322 | 4/1982 | Louch et al. | 118/420 |
| 4,643,126 | 2/1987 | Wilkinson et al. | 118/420 |
| 4,728,387 | 3/1988 | Hilakos | 156/441 |
| 4,850,301 | 7/1989 | Greene, Jr. et al. | 118/223 |
| 4,864,964 | 9/1989 | Hilakos | 118/420 |
| 4,994,303 | 2/1991 | Calkins | 427/434.6 |

FOREIGN PATENT DOCUMENTS

| | | |
|---|---|---|
| 0300321 | 1/1989 | European Pat. Off. |
| 0320650 | 6/1989 | European Pat. Off. |
| 0320653 | 6/1989 | European Pat. Off. |

*Primary Examiner*—W. Gary Jones
*Assistant Examiner*—Steven P. Griffin
*Attorney, Agent, or Firm*—Pennie & Edmonds

[57] ABSTRACT

A method for continuously coating individual fibers of a fiber bundle with resin. The individual fibers are grouped at a single grouping pint defined by a first concave supporting surface. The fibers are directed through a resin bath while spreading the fibers apart on a convex surface in a regularly spaced arrangement to form a continuous coating of resin along at least a portion of the fibers. The convex surface is at least partially described by an arc rotated about a horizontal axis, and comprises at least a portion of a surface of maximum radius R which is symmetrical relative to a vertical plane of symmetry passing through the fiber grouping point. The convex surface is substantially defined by the equation $$r = R\left[1 - \frac{(\sqrt{1 + (x/L)^2} - 1)}{(\pi/2 - \phi)(R/L)}\right]$$

wherein:
 r = the radius of the arc at a distance x from the plane of symmetry passing through the grouping point;
 L = the length of a tangent to the symmetrical surface passing through the grouping point, in the plane of symmetry, between the grouping point and a point tangent to the symmetrical surface; and
 $\phi$ = the radian angle formed between the tangent and a vertical line passing through the center of the second surface.

The coated fibers are cooled to harden the resin thereupon, and are collected thereafter.

13 Claims, 6 Drawing Sheets

METHOD FOR CONTINUOUSLY COATING FIBERS

This is a division of application Ser. No. 07/582,293, filed Sep. 13, 1990 now U.S. Pat. No. 5,133,282.

FIELD OF THE INVENTION

The present invention relates to a method and apparatus for coating fibers and, more particularly, to a device for continuously coating individual fibers of a fiber bundle, e.g., to prevent wear due to friction between adjacent fibers, and the use thereof.

BACKGROUND OF THE INVENTION

A variety of methods and devices for coating fibers with resin are known in the art. For example, U.S. Pat. No. 4,728,387 discloses an apparatus for coating a bundle of glass fibers which comprises at least one convex surface for separating the individual fibers of the bundles, and at least one nonconvex surface, along which the fiber bundle is passed under tension. The fibers are coated by injecting the resin through an orifice which opens upon the nonconvex surface.

The patented device has several drawbacks, however. In particular, the individual fibers of the bundle are not always properly separated from one another. That is, while sometimes the fibers are grouped at the vertex of the convex surface, at other times they form two or more separate bundles on either side of the vertex. This results in the formation of an irregular coating of resin on the fibers of the bundle. The present invention overcomes these drawbacks in the manner described below.

SUMMARY OF THE INVENTION

The present invention provides an improved method and apparatus for continuously coating the individual fibers of a fiber bundle which overcomes the difficulties, such as those described above, observed with prior art devices currently used for this purpose. In particular, the apparatus of the invention now makes it possible to spread the fibers apart on the convex surface in a regularly spaced arrangement to that they can be effectively coated with the coating, e.g., of resin.

The apparatus disclosed herein is also simpler to use than those known in the prior art. Use of applicants' device makes it possible to obtain, much more quickly than was previously possible, a high quality coating on the individual fibers of a fiber bundle at a substantially reduced production cost over that obtainable with the prior art.

The present invention thus relates to an apparatus for continuously coating individual fibers of a fiber bundle with a resin. The apparatus comprises at least three fiber support surfaces, i.e., a first support surface, a second convex support surface located at a distance downstream from the first surface, and a third support surface at a distance downstream from the second support surface and offset in height relative to at least one of the first two support surfaces. By "downstream", applicants mean to refer to the direction of travel of the fiber bundle. In contrast, therefore, "upstream" would refer to the direction opposite to that traveled by the fibers. The supporting surfaces define between them a plurality of fiber paths. The apparatus of the invention further comprises traction means for pulling fibers under tension along the fiber paths, and means for individually coating the fibers with resin along at least a portion of the fiber paths.

An important application for the apparatus of the present invention is in the coating of bundles of glass fibers with resin to improve their resistance to mechanical abrasion. This is accomplished by coating the fibers so as to reduce or eliminate the wear caused due to friction within the bundle which occurs due to the rubbing of adjacent fibers against one another.

A first embodiment of the present invention comprises an apparatus having at least three fiber support surfaces. The first such surface is adapted to group the fibers of the bundle substantially at a single grouping point (P). The second surface, which is convex, is at least partially described by an arc rotated about a horizontal axis, so as to form a surface having a maximum radius R which is symmetrical relative to a vertical plane of symmetry passing through grouping point (P). The relation of the surfaces of the apparatus of the present invention is described by the following equation, wherein 'r represents the radius of the arc, located at distance x from the plane of symmetry passing through grouping point (P):

$$r = R\left[1 - \frac{(\sqrt{1 + (x/L)^2} - 1)}{(\pi/2 - \phi)(R/L)}\right] \qquad (1)$$

where L represents the length of a tangent to the symmetrical surface passing through grouping point (P) in the plane of symmetry, between grouping point (P) and the point tangent to the symmetrical surface, and $\phi$ represents the radian angle formed between the tangent and the vertical line.

A further embodiment of the invention comprises a device of the type described above having at least three support surfaces adapted for supporting the fiber bundle, wherein:

the first surface has a substantially concave configuration, adapted to group the fibers of the bundle substantially at a single grouping point (P); and the second surface is configured such that when the fibers are placed under tension by traction means for pulling them across the coating apparatus, they separate from one another into a spaced apart arrangement on contact with the second surface. The fibers therefore take divergent paths between the first and second surfaces and parallel or convergent paths between the second and third surfaces. The divergent paths are of equal or approximately equal lengths between grouping point (P) and the points of inflection between corresponding divergent path portions and parallel or convergent paths of said fibers, located on said second surface. Moreover, the parallel or convergent paths are of equal or approximately equal lengths between the points of inflection and the third support surface.

In instances where the fiber paths are parallel, the lengths of these paths are measured between the points of inflection on the second surface and the point of inflection located on the third surface between the parallel paths and all other types of fiber paths located downstream from the third surface, which are generally convergent.

In alternate embodiments of the invention, i.e., wherein the fiber paths are convergent approximately at a point (P') downstream from the second surface, the lengths of the paths are measured between the points of inflection on the second surface and the point of convergence (P'), which in this case is advantageously located on the third support surface.

By use of the terms "equal" or "approximately equal" with regard to the lengths of the fiber paths, applicants mean that the differences between these lengths should not exceed several hundreds of microns. More preferably, these lengths should be within tens of microns of each other.

Additional alternate embodiments of the invention further include one or more of the following aspects:

wherein the third support surface is concave, and thus is adapted to group the fibers of the bundle substantially at a single grouping point (P');

wherein the third support surface is convex, such that the fiber paths between the second and third convex surfaces are parallel;

wherein the present apparatus additionally comprises several concave surfaces alternating with the convex surfaces described above for regularly spacing the fibers apart. Each of these concave surfaces is capable of grouping the fibers substantially at a single respective grouping point. The convex surfaces are configured to form divergent fiber paths of equal or approximately equal lengths between the respective grouping points and the points of the alternating convex surfaces, where the inflection occurs between corresponding divergent and convergent fiber paths;

wherein the present apparatus comprises several additional concave surfaces for grouping fibers at or near the respectively aligned grouping points ($P_1, P_2, \ldots P_n$), said concave surfaces alternately located with respect to the convex surfaces adapted for spacing the fibers apart. These convex surfaces are at least partially described by an arc of maximum radius R rotated around their respective horizontal axes, which axes are symmetrical relative to the same vertical plane of symmetry passing through grouping points $P_1, P_2, \ldots P_n$. Additionally, these convex surfaces should satisfy the conditions set forth in the following equation, wherein, r corresponds to the radius of the arc rotated about the respective convex surfaces, located at distance x from the plane of symmetry passing through grouping points $P_1, P_2, \ldots P_n$:

$$r = R\left[1 - \frac{(\sqrt{1 + (x/L)^2} - 1)}{(\pi/2 - \phi)(R/L)}\right] \quad (1)$$

where L is the length of a tangent to a convex surface passing through corresponding grouping point ($P_1$) in the plane of symmetry, between the grouping point ($P_1$) and the point tangent to the convex surface, and $\phi$ corresponds to the radian angle formed between the tangent and the vertical line;

wherein the concave surfaces and the convex surfaces described above are each located on a small bar member having a horizontal axis;

wherein the means for coating the fibers with resin comprises a resin bath, such as those known in the art;

wherein the present apparatus comprises two small concave bar members and two small bar convex members located between the two concave bar members;

wherein the concave surfaces have a straight portion having the shape of an upper case Greek letter "Omega" ($\Omega$) whose lateral branches are inclined toward the outside and whose central portion is horizontal, having a length less than about 1 cm, and advantageously of about 3 mm; and wherein the fiber support surfaces are covered with ceramic.

The invention will be better understood in reading the following description of the preferred embodiments given by way of nonlimiting examples.

DETAILED DESCRIPTION OF THE PREFERRED EMBODIMENTS

Figures 1, 2:
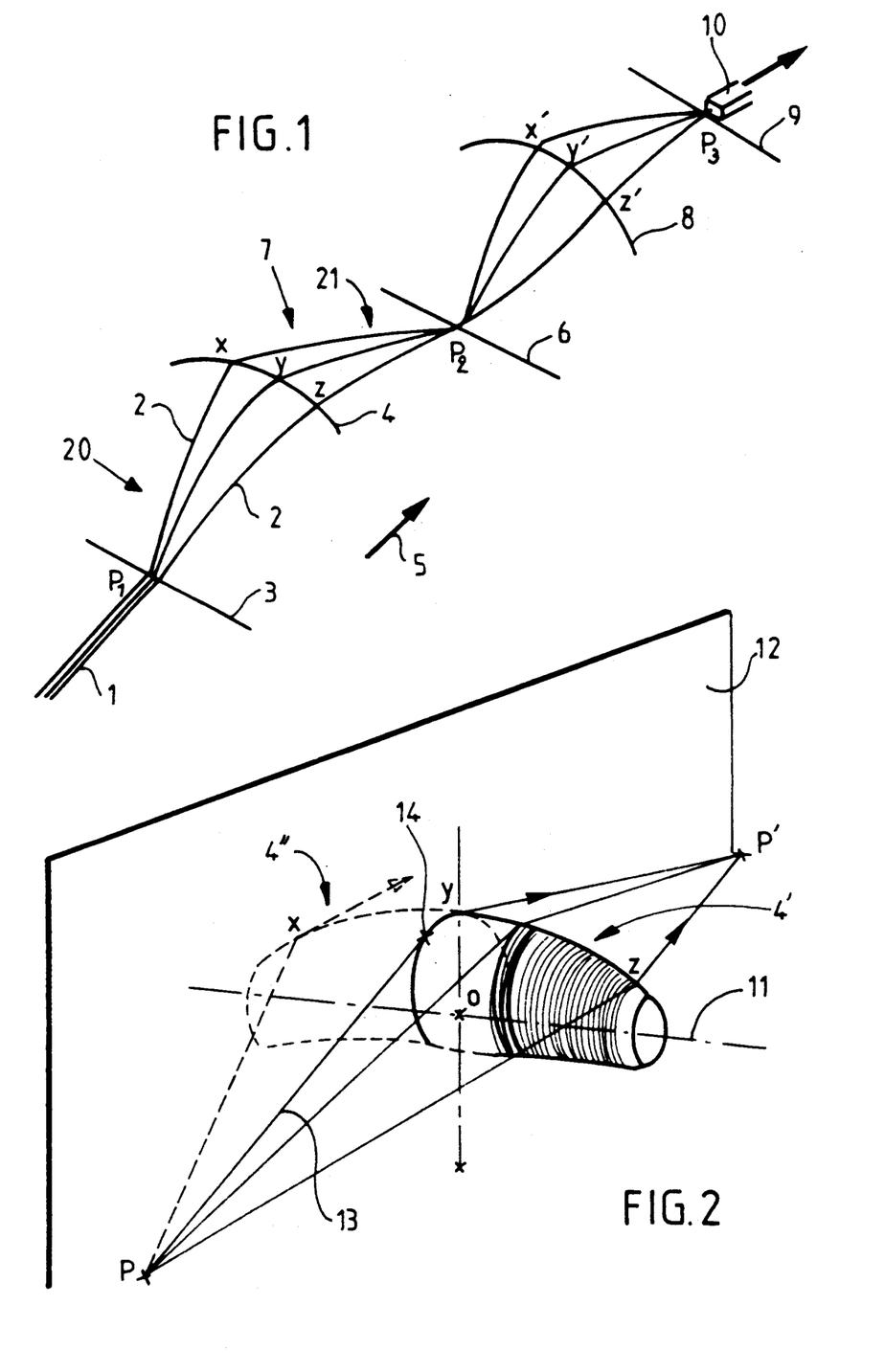
FIG. 1 is a diagrammatic view illustrating an arrangement of fiber support surfaces according to one embodiment of the invention.
FIG. 2 is a perspective view of a second convex support surface formed according to the invention.

Turning initially to FIG. 1, there is illustrated an arrangement of various fiber bundle support surfaces, arranged according to one embodiment of the present invention. Bundle 1 of fibers 2, formed, e.g., of glass, rests against first concave support surface 3, said surface being located above bundle 1, then on second convex support surface 4, located a distance downstream from first surface 3, i.e., in the direction of advance 5 of fiber bundle 1. Second support surface 4 is offset in height relative to first surface 3 and is located below bundle 1. The apparatus of the invention further comprises a third, concave support surface 6 for the fiber bundle, located below and downstream from second surface 4, and also located at a level above bundle 1. The various surfaces 3, 4, 6 define between them paths 7 for fibers 2 of bundle 1.

In FIG. 1, a fourth convex surface 8 has been provided, as well as a fifth concave surface 9, placed downstream from surface 8 in a manner similar to that of surfaces 3, 4 and 6.

The arrangement of these surfaces relative to one another makes it possible for the fiber bundle, which alternately passes above and below the support surfaces, to follow a selected path, with the fibers then being distributed along given paths. Traction means 10, of a type which is known in the art, is utilized to pull the fibers under tension along the fiber paths. In addition, the fiber coating means (not shown in FIG. 1) advantageously comprises a resin bath in which the fiber bundle and the support surfaces are placed.

Figure 3:
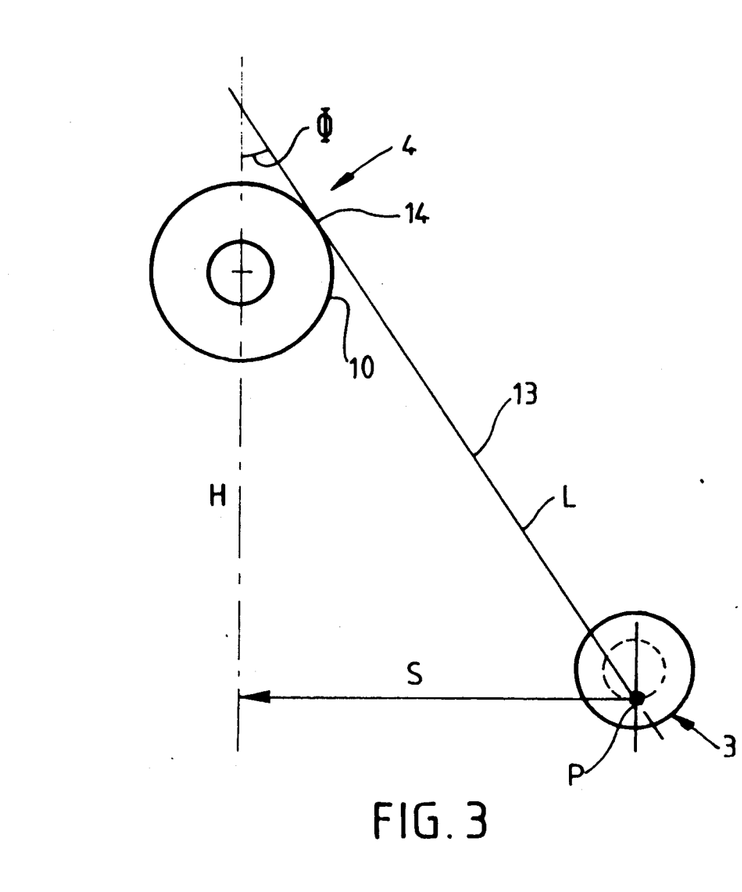
FIGS. 3 and 4 are, respectively, a side view and an overhead view of a further embodiment of the first and second fiber support surfaces formed according to the invention.
Figure 4:
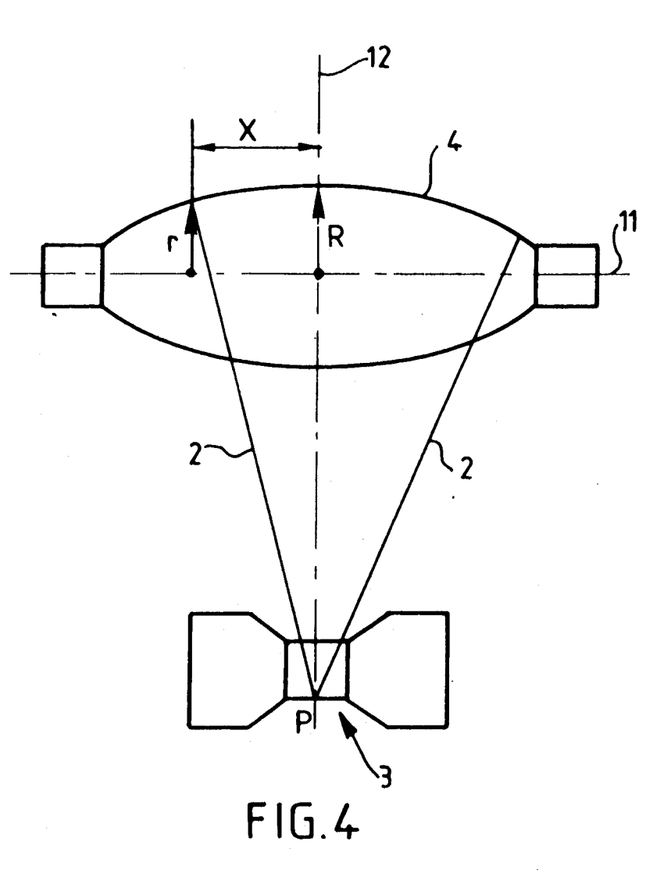

FIGS. 2, 3 and 4 illustrate configurations of support surfaces shown according to the alternate embodiments of the invention described more particularly below.

As discussed above, the devices used in the prior art to coat individual fibers in a fiber bundle do not always adequately space the fibers apart from each other. This results in an insufficient and/or irregular coating of fibers with resin. To eliminate this drawback, the presently disclosed apparatus correctly spaces the fibers in a repetitive and satisfactory manner. The arrangement of the fibers is initiated at first surface 3, which has a concave configuration. Surface 3 is adapted to group the fibers of the bundle substantially at a single grouping point (P). Second surface 4 or 4' is convex, and at least partially described by an arc rotated around horizontal axis 11. Surface 4 or 4' is formed upon or joined to surface 4'', which is symmetrical relative to vertical plane 12 passing through grouping point (P), and meets the relationship expressed in the following equation:

$$r = R \left[ 1 - \frac{(\sqrt{1 + (x/L)^2} - 1)}{(\pi/2 - \phi)(R/L)} \right] \quad (1)$$

where r is the radius of the arc at least partially described around convex portion 4' of the second surface located at distance x from plane of symmetry 12 passing through grouping point (P), R is the maximum radius around horizontal axis 11 of symmetrical surface 4'', L corresponds to the length of tangent 13 to symmetrical surface 4'', which passes through grouping point (P) and tangent point 14 to symmetrical surface 4'' and $\phi$ corresponds to the radian angle formed between tangent 13 and the vertical line.

Grouping "point" (P) may not be an actual "point" but rather it may have, for example, a width on the order of 3 mm. This means that the grouping "point" has a narrow width relative to the width over which the fibers are spread on the convex surface as well as relative to the lateral dimension (perpendicular to the longitudinal direction of path of the bundle) of the convex support surface.

The relations between the parameters mentioned above are also expressed by the following two equations:

$$\phi = \tan^{-1} \left[ \frac{S - R \cos\phi}{H - R \sin\phi} \right] \quad (2)$$

$$L = \left[ \frac{H + R \sin\phi}{\cos\phi} \right] \quad (3)$$

with H representing the vertical distance between horizontal axis 11 and the horizontal plane passing through (P) and wherein S is the horizontal distance between the vertical plane passing through horizontal axis 11 and grouping point (P).

These formulas make it possible to calculate the dimensions of convex surfaces 4, 8 . . . , and can, for example, be introduced into the programming of a lathe having a numerical control so as to automatically machine bars having correctly dimensioned convex surfaces. As would be well known to one of ordinary skill in the art, the units to be used in the formulas above must obviously be consistent.

In an apparatus constructed as described herein (see FIG. 1), the second fiber support surface may have a configuration such that, when the fibers are placed under tension by traction means 10, they separate from one another on contact with second surface 4 and follow divergent paths 20 between first surface 3 and second surface 4, and parallel or convergent paths 21 between second surface 4 and third surface 6, in a manner such that the length of divergent paths 20 are equal or approximately equal to each other and the length of parallel or convergent paths 21 are equal or approximately equal between them.

Referring once again to FIG. 1, the convex and concave surfaces formed according to the invention, such as $P_1$, $P_2$, $P_3$, designate the grouping points of fibers on concave surfaces, 3, 6, 9, wherein X, Y, Z and X', Y', Z' indicate the points of inflection of the fiber paths on convex surfaces 4 and 8 wherein:

$P_1X = P_1Y = P_1Z \ldots ; P_2X = P_2Y = P_2Z;$
$P_2X' = P_2Y' = P_2Z' \ldots ; P_3X' = P_3Y' = P_3Z' \ldots$ FIG. 4, illustrates an alternate embodiment of the concave surface formed according to the invention. The surface exhibits a straight section in the shape of an inverted Omega ($\Omega$) whose two branches are inclined outwardly.

Figure 5A:
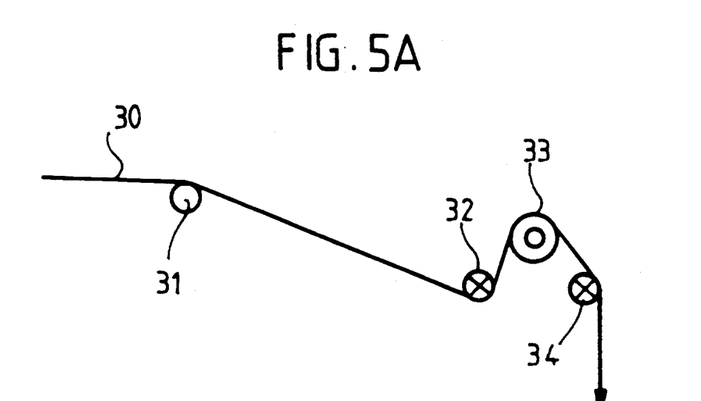
FIGS. 5a, 5b, and 5c are side views of support bars used with three alternate embodiments of the invention.
Figure 5B:
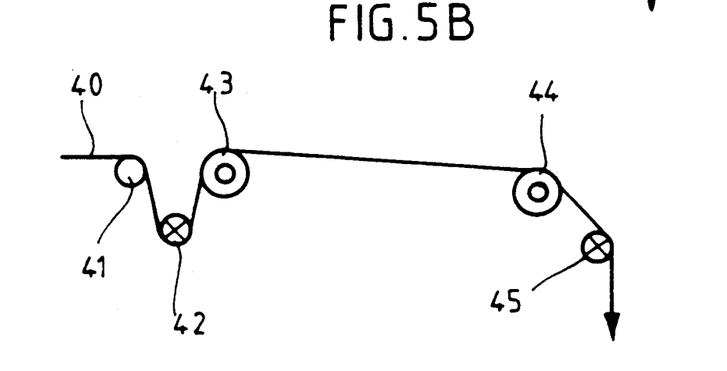
Figure 5C:
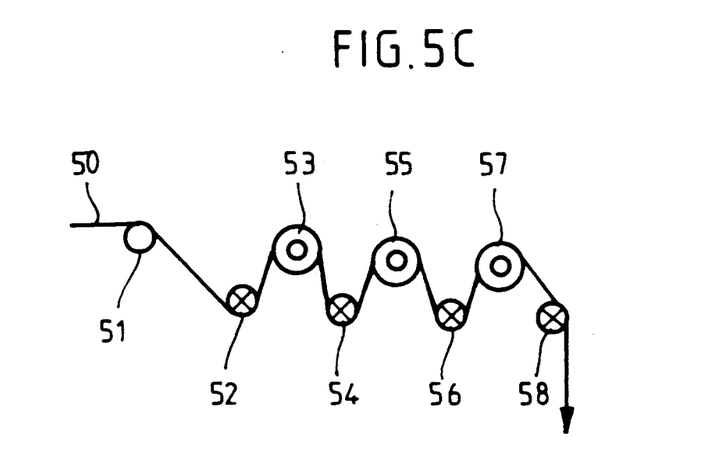

FIGS. 5a, 5b and 5c diagrammatically illustrate configurations of surface arrangements formed according to the invention, which comprise small bars which are either stationary or which are capable of rotation around their axis.

Three configurations for such bars, i.e., cylindrical, concave and convex, are illustrated diagammatically in FIGS. 5a, 5b and 5c. These bars are respectively represented by circles, circles with crosses and double concentric circles.

FIG. 5a illustrates fiber bundle 30 as it passes over first cylindrical guide bar 31, under second bar 32 having a concave surface, over third bar 33 having a convex surface and finally over a fourth concave bar 34.

FIG. 5b illustrates another particularly advantageous arrangement of guide bars according to the invention. Fiber bundle 40 passes over at least a first small cylindrical guide bar 41, under a second small bar 42 having a concave surface and then over a third bar 43 and a fourth bar 44, both having convex surfaces. The paths of the fibers after they are spaced apart by convex bar 43 are parallel between third and four bars 43 and 44, respectively. The fibers are then gathered at or near the grouping point over fifth concave bar 45. The fiber path lengths between two successive small bars are equal or approximately equal.

Finally, FIG. 5c illustrates an embodiment of the invention where concave bar members 52, 54, 56, 58 and convex bar members 53, 55, and 57 are alternated along the path of fiber 50, after passing to rest on a first small bar member 51, which may, for example, be cylindrical.

The inventors have experimentally determined that a number less than or equal to a total of 8 concave and convex bar members is the most advantageous arrangement.

The apparatus of the invention may be used with all types of fibers and, in particular, with bundles of glass fibers formed, for example of alkali-resistant glass or of E-type glass. Where the present apparatus is used with a bundle of glass fibers, the fibers may have, for example, average diameters on the order of from about 10 to 20 microns. The fiber bundle is provided in the form of a so-called "roving" roll having, e.g., a weight of 1200 g per 1,000 meters of bundle.

The resin used for coating the fibers may be of any appropriate composition, provided that it is chemically compatible with the material of which the fibers to be coated are formed. By way of a nonlimiting example, for coating glass fibers, polymer resins or thermoplastic resins, such as nylon, for example, of the type sold under the trade name ICI A100 Maranyl, having a viscosity on the order of 60 Pa's; or polypropylene, sold under the trade name SOLVAY Eltex P RY210, having a viscosity on the order of 600 Pa's may be effectively utilized.

Obviously, the higher the viscosity of the coating material, the more difficult it will be to coat the fibers. With an apparatus constructed according to the invention, however, resins having a high viscosity, i.e., up to about 10,000 Pa's, may be utilized.

The passage rate of the fiber bundle through the resin bath preferably ranges from about 2 to about 20-30 meters per minute with the apparatus of the invention. This passage rate quite obviously depends on many factors but it can, however, reach values of up to 50 to 100 meters per minute while still forming an acceptable coating on the fibers.

Moreover, the tension obtainable with the traction device used with the present apparatus depends on a variety of parameters, including the viscosity of the resin, the rate of displacement of the bundle in the bath, etc. For example, to coat a bundle of E type glass fibers, an apparatus as described herein, having less than eight support surfaces and using a resin having a viscosity on the order of 200 Pa's and a traction force on the order of 50 kg has proven sufficient to obtain a satisfactory rate of coating.

A ceramic coating of, for example, a titanium nitride base, may advantageously be provided upon the support surfaces of applicants' apparatus to minimize friction between the support and the fibers.

Figure 6:
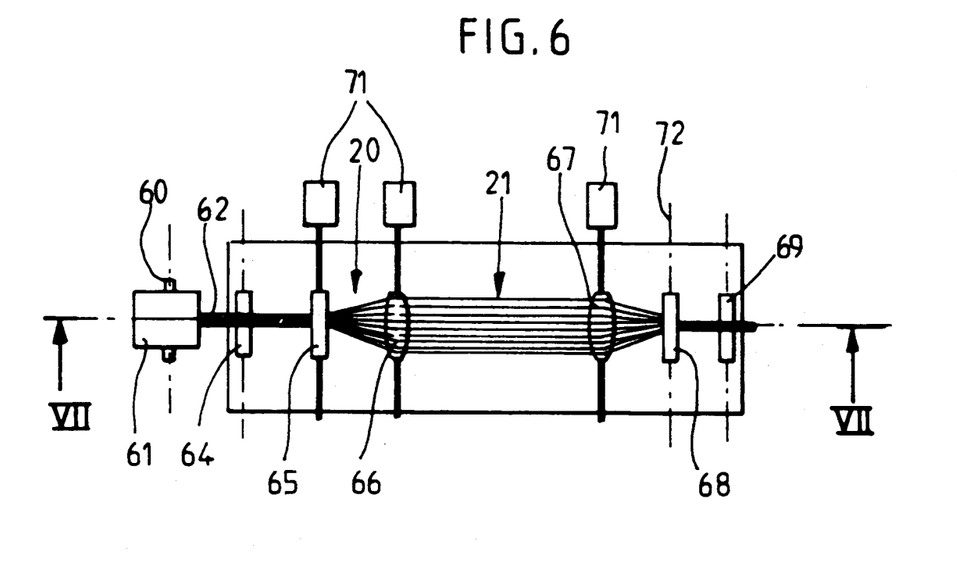
FIG. 6 is illustrating how the fibers of a fiber bundle are separated according to a preferred embodiment of the invention.
Figure 7:
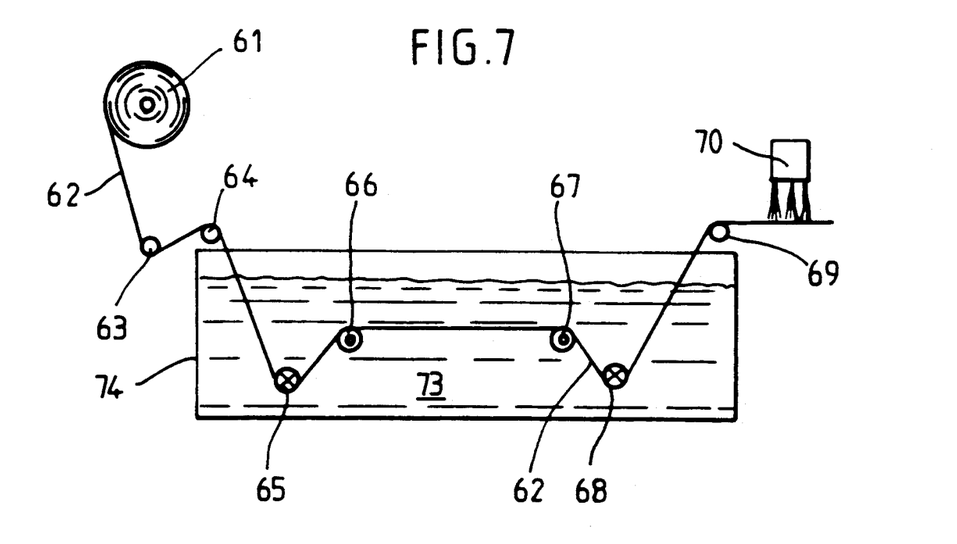
FIG. 7 is a sectional view taken along line VII—VII of FIG. 6.

FIGS. 6 and 7 illustrate a preferred embodiment of an apparatus formed according to the present invention. The apparatus comprises support 60 for a roll or "roving" 61 comprising bundle 62 of glass fibers wound on itself. The bundle is directed, for example, by a pair of cylindrical 63 and 64 located above resin bath 73 within tank 74. Bundle 62 then passes under bar 65 which has a concave surface and then over bar 66 having a convex support surface. Bundle 62 is then routed to second convex bar 67; the paths of the individual fibers between the two convex surfaces 66 and 67 being parallel. The glass fibers in the resin bath are thus separated for as great a distance as possible. Fiber bundle 62 then passes under concave bar 68 and exits from resin bath 73, while being, for example, oriented horizontally by cylindrical bar 69 in the direction of cooling device 70 for solidifying the resin and toward means for cutting the fiber bundle into segments or for winding and storage of the roving thus treated (not shown).

Driving devices 71 such as those known in the art, operatively associated with the concave and convex surfaces or the bar members formed according to the invention, serve to help advance bundle 62 all along its path in the resin bath.

Figure 8:
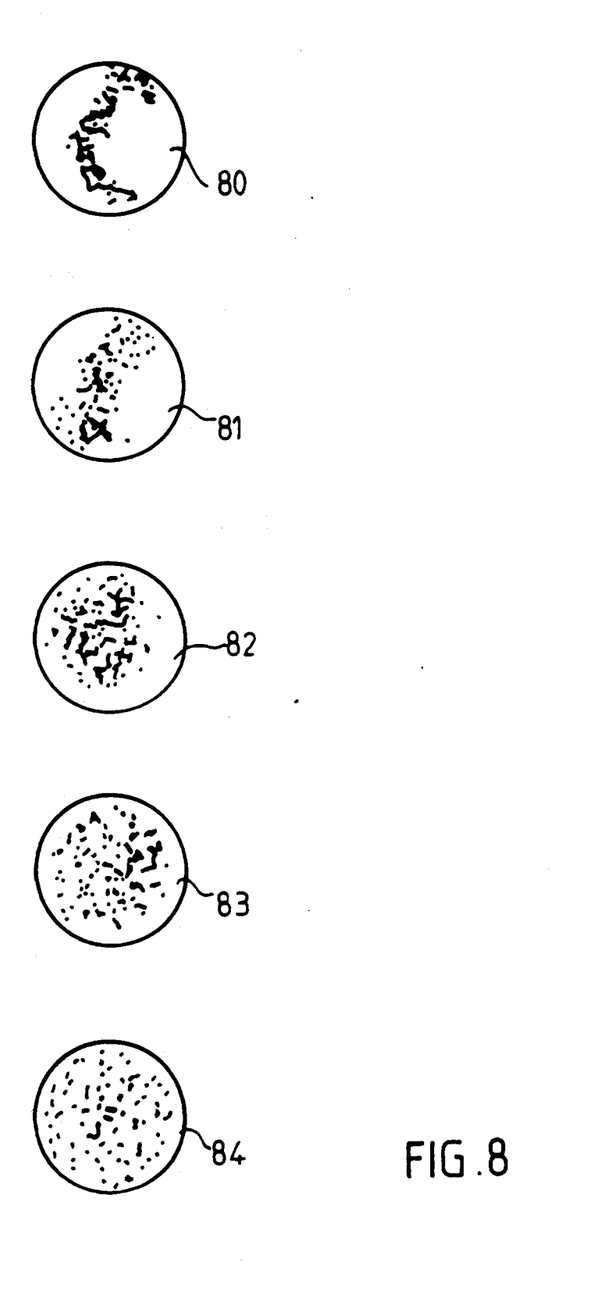
FIG. 8 illustrates a system of notation and empirical evaluation of the coating of fibers of a fiber bundle with resin according to the present invention.

FIG. 8 illustrates an empirical grading system developed by applicants for evaluating the quality of the coating on the fibers of a fiber bundle as obtained with the presently described apparatus. These illustrations represent cross-sectional views of the fibers taken through the fiber bundle. "Grade" O, designated by 80 in FIG. 8, indicates a poor coating on the fibers, whereas grades 1,2,3 designated, respectively, by nos. 81-83 show increasingly improved coatings. Grade 4, corresponding to reference no. 84 in FIG. 8 indicates an optimal coating.

Figure 9:
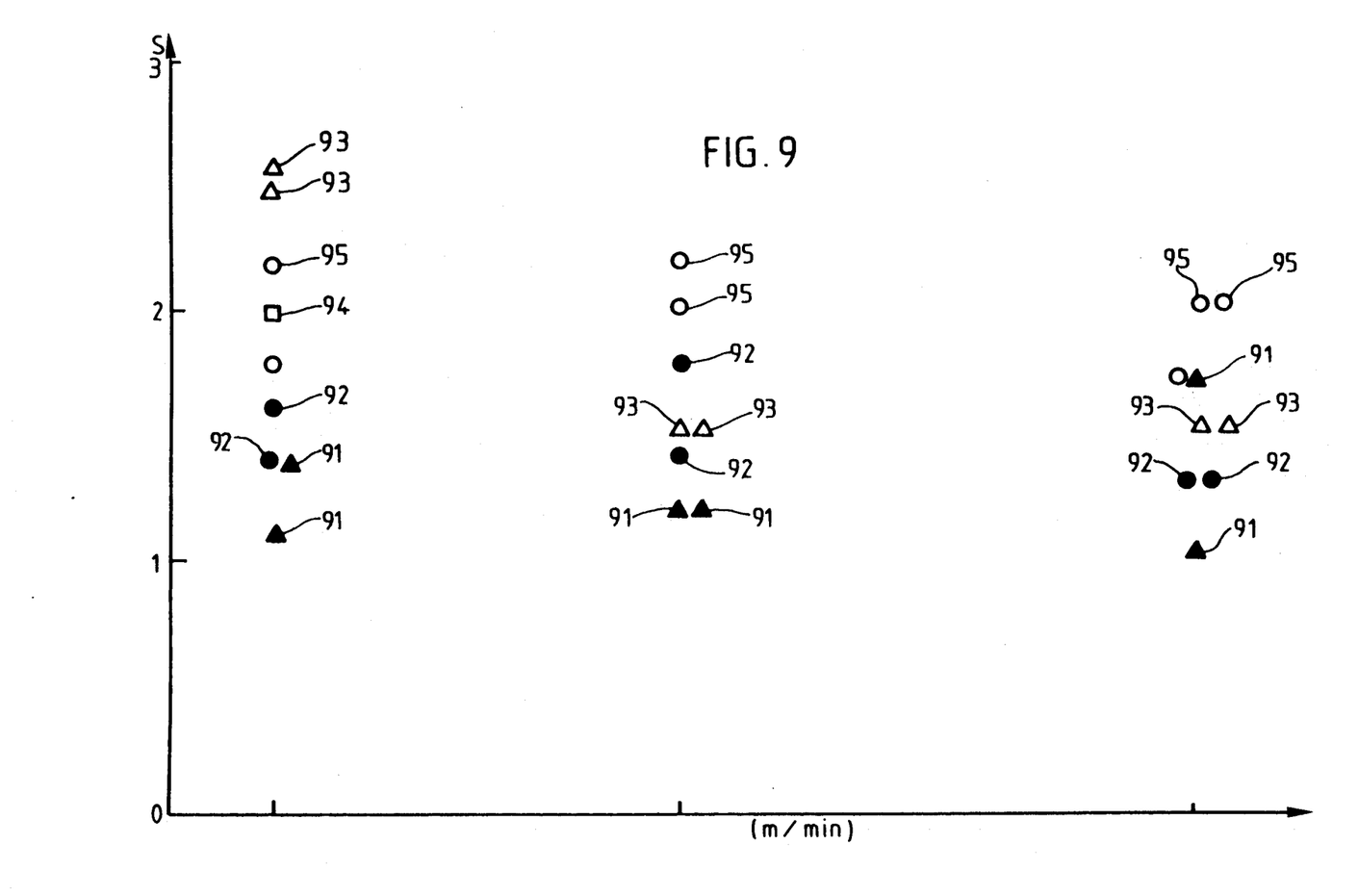
FIG. 9 is a diagram comparing the coating results obtained with various devices constructed according to the prior art to those obtained with the apparatus of the present invention.

FIG. 9 is a graph in which the abcissa represents various rates of passage of the fiber through the bath in meters per minute and wherein the ordinate represents the coating "grades" corresponding to those shown in FIG. 8. This diagram, provided by way of example to illustrate the advantages of the invention relative to the prior art, represents the appearance of coated bundles of "E type" glass fibers, having a fiber diameter on the order of 20 microns (e.g., 17 microns) coated with a polypropylene resin.

The shaded triangles numbered 91 indicate results obtained with prior art devices comprising 4 small cylindrical or convex bars for guiding the bundle, located between the roll or roving comprising an uncoated bundle of fibers and the roll of a coated bundle.

The guide bars described below are also positioned between two rolls of fiber, i.e., a first uncoated roll and a second coated roll.

The shaded circles numbered 92 correspond to the results obtained with the use of prior art devices having 2 cylindrical or convex guide bars.

The unshaded triangles numbered 93 represent the results obtained with a device constructed according to the present invention comprising 4 alternately convex/concave bars.

The unshaded square numbered 94 corresponds to the result obtained with the use of a device constructed according to the present invention comprising a total of 8 convex and concave bar members, arranged alternately.

Finally, the unshaded circles numbered 95 in FIG. 9 represent the results obtained with the use of a preferred embodiment of the present invention corresponding to that illustrated in FIGS. 6 and 7, comprising a concave bar, two convex bars and a concave bar located downstream from the convex bars.

FIG. 9 therefore clearly demonstrates that the results obtained with devices constructed according to the invention are better than those obtained with the use of prior art devices.

The process for coating fibers with a resin utilizing the presently disclosed apparatus will now be described utilizing to the embodiment illustrated in FIGS. 6 and 7.

Roving 61 is placed on support 60. Bundle 62 is then unwound between the various surfaces of bars 63, 64, 65, 66, 67, 68, 69 of the device (as indicated above) until the bundle is engaged by traction means 10 (see, e.g., FIG. 1) adapted to pull the bundle through resin bath 73.

Another way of practicing the method of the invention comprises installing the bundle in position upon the cylindrical and convex bars, with the concave bars having been removed previously. Once the bundle is in place, the concave bars are then inserted to stretch the fibers. The spacing between the fibers which occurs on the convex surfaces is then checked. This spreading is optionally assisted by vertical pressure of the bundle on the convex surfaces, which makes it initially possible to correctly position the bundle. The resin is then introduced into tank 74 at a temperature of generally from 10°-40° C. over its melting temperature, if this has not been previously done. The bath is then maintained at the desired temperature in a manner known in the art.

The roving is continuously unwound by pulling the bundle, whose fibers are thus coated with resin by passing through the bath, via the traction means. The spacing of the fibers is checked periodically, typically by eye.

The traction force exerted on the fiber bundle at the output of the resin bath may be, for example, on the order of 50 kg, with the bundle unwinding at a rate on the order of 10 m/min. When the coated bundle exits the resin bath, it is cooled, for example, by a spray of water which hardens the sheaths of resin formed around the fibers. The coated bundle is then collected and stored, for example, in a roll. Alternately, the coated fiber bundle may be cut into pellets for later use.

While it is apparent that the invention herein disclosed is well calculated to fulfill the objectives stated above, it will be appreciated that numerous modifications and embodiments may be devised by those skilled in the art. It is intended that the appended claims cover all such modifications and embodiments as fall within the true spirit and scope of the present invention.

We claim:

1. A process for continuously coating a plurality of fibers forming a fiber bundle, said process comprising:
   a) providing support means configured and adapted for supporting a fiber bundle formed of a plurality of individual fibers, said support means comprising
      i) a first fiber bundle support surface, adapted for grouping the fibers of said bundle substantially at a grouping point, said first surface being concave in shape;
      ii) a second fiber bundle support surface located a distance downstream from said first support surface, said second surface being convex in shape and at least partially described by an arc rotated about a horizontal axis thereof, wherein said second surface comprises at least a portion of a surface of maximum radius R which is symmetrical relative to a vertical plane symmetry passing through said grouping point, and wherein said second surface is substantially defined by the equation $$r = R\left[1 - \frac{(\sqrt{1 + (x/L)^2} - 1)}{(\pi/2 - \phi)(R/L)}\right]$$

wherein:
   r = the radius of said arc at a distance x from the plane of symmetry passing through said grouping point;
   L = the length of a tangent to the symmetrical surface passing through the grouping point, in the plane of symmetry, between the grouping point and a point tangent to the symmetrical surface; and
   φ = the radian angle formed between the tangent and a vertical line passing through the center of said second surface, and
      iii) a third fiber bundle support surface located a distance downstream from said second support surface and offset in height relative to at least one of said first two surfaces, said first, second and third surfaces defining between them paths for said fibers while spreading said fiber apart on said convex surface in a regularly spaced arrangement within bath means adapted for continuously applying a resin coating to said fibers, said bath means having a first end and a second end;
   b) positioning at said first end of said bath means a roving roll of glass fibers;
   c) connecting a first end of said roving roll to traction means for pulling said fibers through said bath means, said traction means located at said second end of said bath means;
   d) pulling said fibers of said roving roll through said bath means by said traction means such that said fibers are directed by said support surfaces in a predetermined configuration, so as to form a continuous uniform coating of resin along at least a portion of said fibers;
   e) cooling said coated fibers to harden said coating formed thereupon; and
   f) collecting said coated fibers.

2. The process of claim 1 wherein said fibers are pulled through said bath means at a rate of up to about 50–100 meters per minute.

3. The process of claim 2 wherein the passage rate of said fibers through said bath means ranges between about 2–30 meters per minute.

4. The process of claim 1 wherein said resin coating has a viscosity of up to about 10,000 Pa's.

5. The process of claim 4 wherein the viscosity of said resin ranges between about 60–600 Pa's.

6. The process of claim 1 wherein said traction means applies a force of about 50 kg. to said fibers.

7. A process for continuously coating a plurality of fibers forming a fiber bundle, said process comprising:
   a) providing an apparatus for continuously coating fibers of a fiber bundle within bath means, said bath means having a first end and a second end and adapted for continuously applying a resin coating to said fibers, said apparatus comprising;
   1) at least three support surfaces configured and adapted for supporting a fiber bundle formed of a plurality of individual fibers, said support surfaces comprising
      i) a first concave fiber bundle support surface, adapted for grouping the fibers of said bundle substantially at a grouping point;
      ii) a second convex fiber bundle support surface located a distance downstream from said first support surface, said second surface at least partially described by an arc revolved about its horizontal axis, wherein said second surface comprises at least a portion of a surface of maximum radius R which is symmetrical relative to a vertical plane of symmetry passing through said grouping point, and wherein said second surface is substantially defined by the equation $$r = R\left[1 - \frac{(\sqrt{1 + (x/L)^2} - 1)}{(\pi/2 - \phi)(R/L)}\right]$$

wherein:
   r = the radius of said arc at a distance x from the plane of symmetry passing through said grouping point;
   L = the length of a tangent to the symmetrical surface passing through the grouping point, in the plane of symmetry, between the grouping point and a point tangent to the symmetrical surface; and $\phi$ = the radian angle formed between the tangent and a vertical line intersecting said horizontal axis, and iii) a third fiber bundle support surface located a distance downstream from said second support surface and offset in height relative to at least one of said first two surfaces, said first, second and third surfaces defining between them paths for said fibers;

2) traction means for pulling said fibers under tension along said fiber paths; and 3) means operatively associated with said support surfaces for coating said fibers with a resin along at least a portion of said fiber paths;

b) positioning at said first end of said bath means a roving roll of glass fibers;

c) connecting a first end of said roving roll to said traction means for pulling said fibers through said bath means, said traction means located at said second end of said bath means;

d) pulling said fibers of said roving roll through said bath means by said traction means such that said fibers are directed by said support surfaces in a predetermined configuration, so as to form a continuous uniform coating of resin along at least a portion of said fibers;

e) cooling said coating fibers to harden said coating formed thereupon; and f) collecting said coating fibers.

8. A process for continuously coating a plurality of fibers forming a fiber bundle, said process comprising:

a) providing bath means having a first end and a second end and adapted for retaining and continuously applying a resin coating for said fibers;

b) directing a fiber bundle through said bath means, wherein said directing step includes initially grouping said fibers of said bundle on a first concave fiber support surface and subsequently spreading said fibers apart on a first convex surface in a regularly spaced arrangement and wherein said directing step further includes routing individual fibers of said bundle along parallel paths between said first convex fiber support surface and a second convex fiber support surface;

c) cooling the coated fibers to harden the resin thereupon; and d) collecting the coated fibers.

9. The process of claim 8 which further comprises configuring the convex surface over which the fibers pass in an arc revolved about its horizontal axis, wherein said convex surface comprises at least a portion of a surface of maximum radius R which is symmetrical relative to a vertical plane of symmetry passing through a grouping point defined by said concave surface, and wherein said convex surface is substantially defined by the equation $$r = R\left[1 - \frac{(\sqrt{1 + (x/L)^2} - 1)}{(\pi/2 - \phi)(R/L)}\right]$$

r = the radius of said arc at a distance x from the plane of symmetry passing through said grouping point;

L = the length of a tangent to the symmetrical surface passing through the grouping point, in the plane of symmetry, between the grouping point and point tangent to the symmetrical surface; and $\phi$ = the radian angle formed between the tangent and a vertical line.

10. The process of claim 8 which further comprises positioning a roving roll of said fibers at said first end of the bath means for directing the fibers into the resin.

11. The process of claim 10 which further comprises pulling the fibers through the resin by connecting the roving roll to traction means and pulling the fibers through the bath means using the traction means.

12. The process of claim 8 which further comprises coating at least one of said support surfaces to reduce friction between said fibers and said at least one support surface.

13. The process of claim 8, further including routing individual fibers of said bundle along converging paths between said second convex fiber support surface and a second concave support surface.

* * * * *